(12) United States Patent
Yokota et al.

(10) Patent No.: US 8,984,984 B2
(45) Date of Patent: Mar. 24, 2015

(54) STEERING APPARATUS

(71) Applicant: Yamada Manufacturing Co., Ltd, Kiryu-shi (JP)

(72) Inventors: Norihiko Yokota, Isesaki (JP); Takahiro Maniwa, Isesaki (JP)

(73) Assignee: Yamada Manufacturing Co., Ltd., Kiryu-Shi, Gunma (JP)

( * ) Notice: Subject to any disclaimer, the term of this patent is extended or adjusted under 35 U.S.C. 154(b) by 0 days.

(21) Appl. No.: 14/020,728

(22) Filed: Sep. 6, 2013

(65) Prior Publication Data

US 2014/0076091 A1 Mar. 20, 2014

(30) Foreign Application Priority Data

Sep. 14, 2012 (JP) ................ 2012-203691

(51) Int. Cl.
*B62D 1/18* (2006.01)
*B62D 1/184* (2006.01)
*B62D 1/187* (2006.01)

(52) U.S. Cl.
CPC . *B62D 1/18* (2013.01); *B62D 1/184* (2013.01)
USPC ............................................. 74/493; 280/775

(58) Field of Classification Search
CPC .......... B62D 1/18; B62D 1/184; B62D 1/185; B62D 1/187
USPC .................................... 74/493, 495; 280/775
See application file for complete search history.

(56) References Cited

U.S. PATENT DOCUMENTS

| | | | | | |
|---|---|---|---|---|---|
| 5,306,032 | A | * | 4/1994 | Hoblingre et al. | 280/775 |
| 5,845,936 | A | * | 12/1998 | Higashino | 280/775 |
| 6,467,807 | B2 | * | 10/2002 | Ikeda et al. | 280/775 |
| 6,623,036 | B2 | * | 9/2003 | Yamamura et al. | 280/775 |
| 6,948,741 | B2 | * | 9/2005 | Manwaring et al. | 280/775 |
| 7,726,691 | B2 | * | 6/2010 | Yamada | 280/775 |
| 7,874,588 | B2 | * | 1/2011 | Cymbal | 280/775 |
| 8,678,435 | B2 | * | 3/2014 | Sakata | 280/775 |
| 8,757,664 | B2 | * | 6/2014 | Moriyama et al. | 280/775 |
| 2006/0170204 | A1 | * | 8/2006 | Higashino et al. | 280/775 |
| 2012/0247258 | A1 | * | 10/2012 | Maniwa et al. | 74/493 |

FOREIGN PATENT DOCUMENTS

JP 2005-047487 A 2/2005

* cited by examiner

*Primary Examiner* — Paul N Dickson
*Assistant Examiner* — Laura Freedman
(74) *Attorney, Agent, or Firm* — McGinn IP Law Group, PLLC

(57) ABSTRACT

The steering apparatus includes an inner column, a left-right pair of outer column half bodies, a fixing bracket having fixing side portions, and a clamping tool. In a condition where the inner column is clamped fixedly via the clamping tool, the inner column is held by the holding surface portions of the two outer column half bodies, and an upper recessed indentation portion and a lower recessed indentation portion that do not contact the inner column are formed on the respective holding surface portions of the two outer column half bodies. Strip-form contact portions that contact the inner column are formed in locations on either circumferential direction side of the upper recessed indentation portion and the lower recessed indentation portion, the strip-form contact portions being formed in at least four locations on the two outer column half bodies.

15 Claims, 8 Drawing Sheets

ENLARGEMENT ALONG Y1-Y1 ARROW

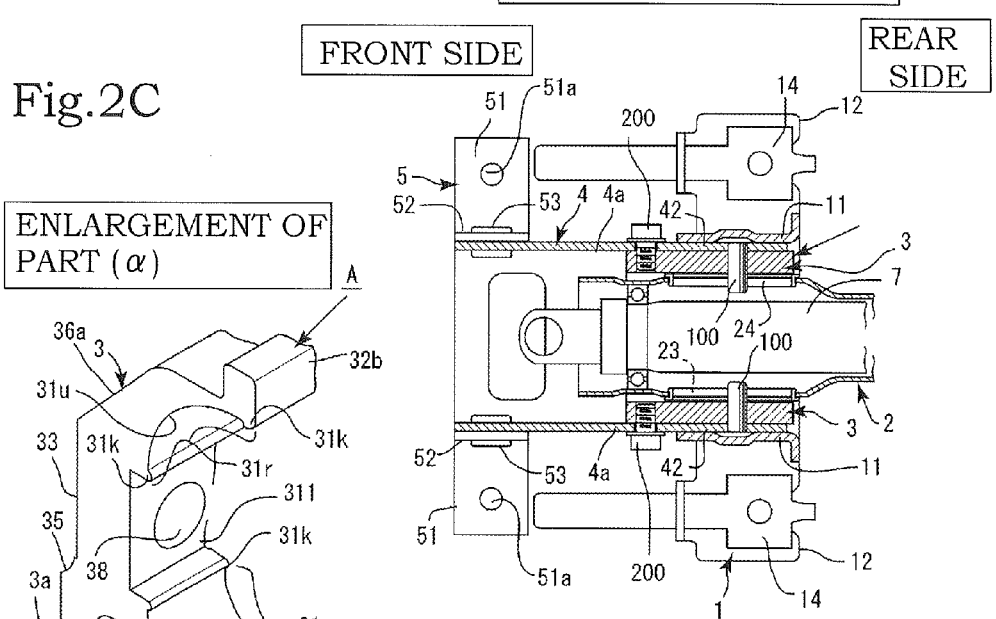
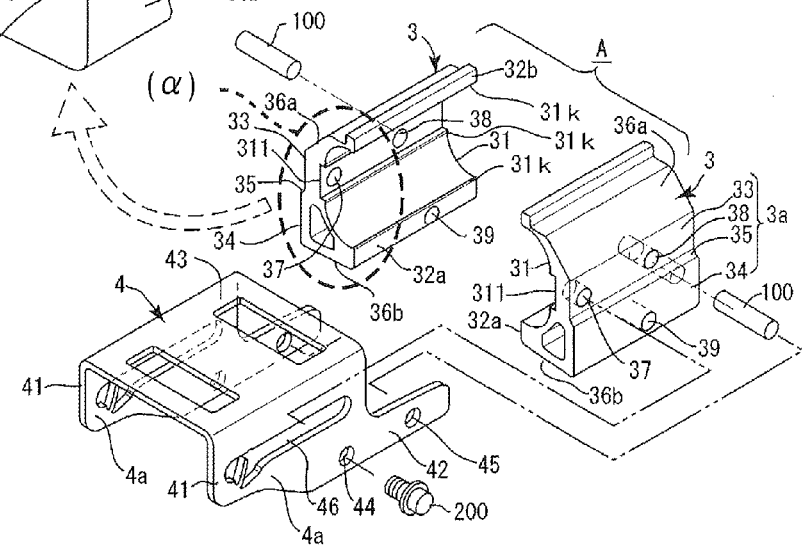

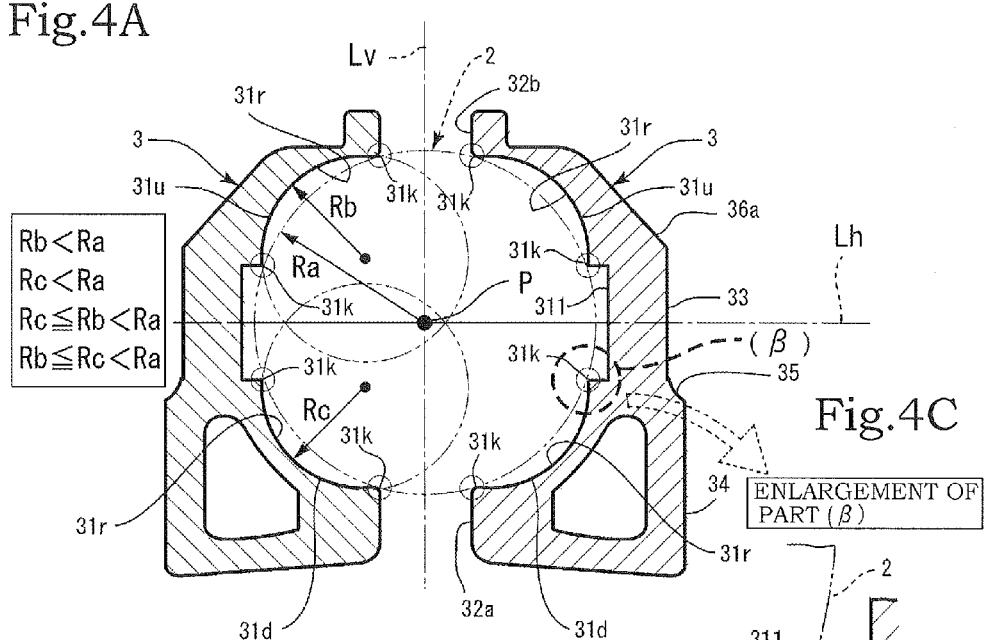
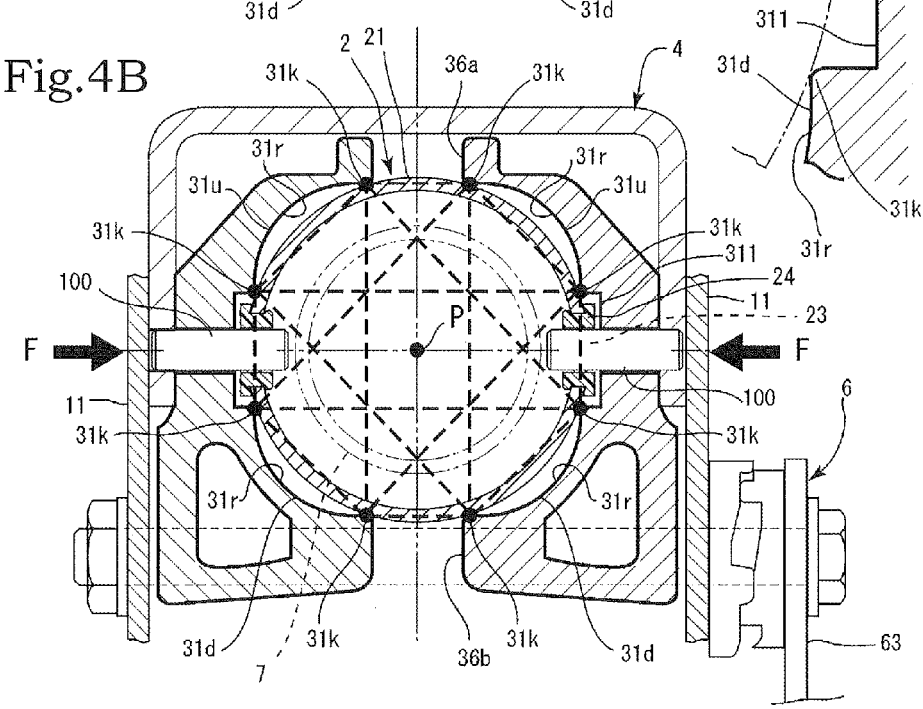

Fig.8A
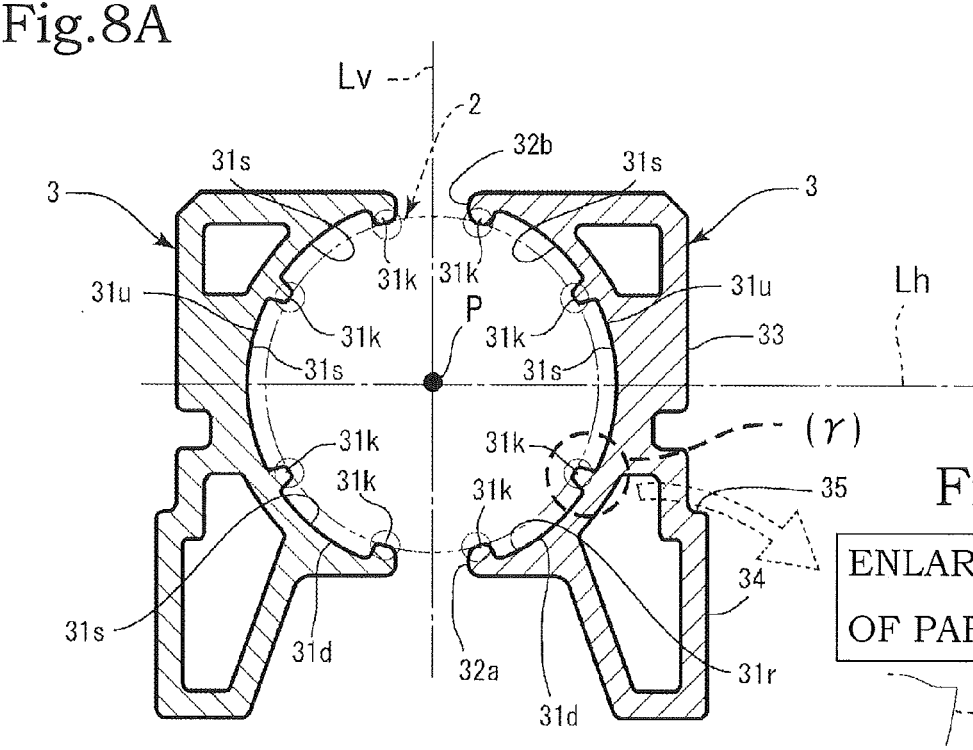
Fig.8C
ENLARGEMENT OF PART (γ)
Fig.8B
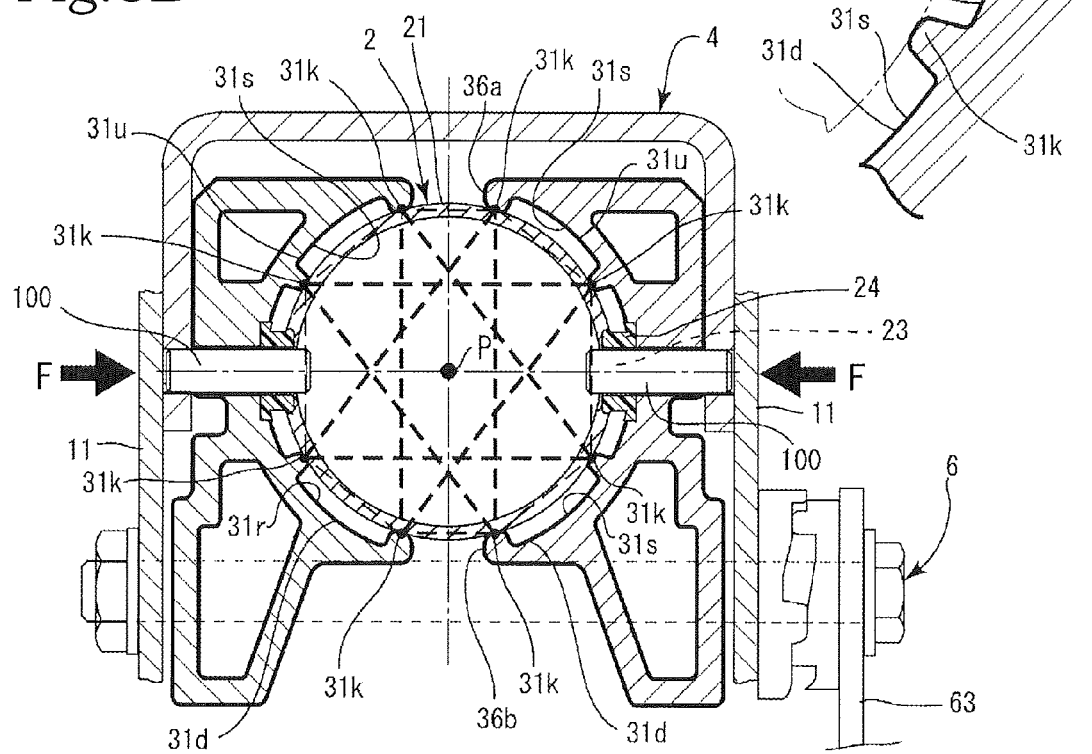

STEERING APPARATUS

BACKGROUND OF THE INVENTION

1. Field of the Invention

The present invention relates to a steering apparatus including a tilt/telescopic adjustment mechanism, with which a firm clamping condition can be maintained during tilt/telescopic adjustment such that rattling throughout the entire apparatus can be prevented.

2. Description of the Related Art

Various steering apparatuses having a tilt/telescopic function exist. One of these apparatuses is a steering apparatus disclosed in Japanese Patent Application Publication No. 2005-47487. The steering apparatus disclosed in Japanese Patent Application Publication No. 2005-47487 will be described briefly below. Note that reference symbols used in Japanese Patent Application Publication No. 2005-47487 are used here as is. An outer column 21 includes a cylindrical portion 21a, and a pair of flange portions 21c, 21d disposed discretely in an axial direction on a vehicle body rear side outer periphery of the cylindrical portion 21a (see FIG. 2 of Japanese Patent Application Publication No. 2005-47487).

An inner column 11 is held so as to be enveloped by the cylindrical portion 21a. A telescopic groove 11a is formed parallel to an axis on either side of the inner column 11 (see FIG. 1 of Japanese Patent Application Publication No. 2005-47487). A tension member 13 is disposed between the flange portions 21c, 21d serving as pressing portions. An upper-lower pair of slits 21e, 21e are formed in the cylindrical portion 21a from a vehicle body rear side end portion so as to divide the flange portions 21c, 21d.

A maximum width of the tension member 13 is smaller than a maximum width of the outer jacket 21. Right half portion and left half portion inner peripheral surfaces of the flange portion 21d of the outer jacket 21 are shaped such that when the flange portion 21d contacts an outer peripheral surface of the inner column 11, gaps are formed in a right side face and a left side face. In other words, the right half portion and left half portion inner peripheral surfaces of the flange portion 21d respectively include recessed portions 21g (see FIG. 4A of Japanese Patent Application Publication No. 2005-47487).

The recessed portion 21g is divided vertically into two by a horizontal line passing through the axis of the inner column 11, and is substantially line-symmetrical about the horizontal line. An inner peripheral surface of the flange portion 21c includes similar recessed portions. When an operating lever L is rotated in a clamping direction, a pressing force is exerted on the respective outer peripheral surfaces of the flange portions 21c, 21d of the outer jacket 21 by bracket portions 12a.

When the outer jacket 21 is pressed from both sides, the slits 21e deform so as to close, causing an inner diameter of the outer jacket 21 to decrease so as to hold the inner column 11. When the two bracket portions 12a press the outer jacket 21 by a force F, the outer jacket 21 contacts the inner column 11 at boundary points X on respective circumferential direction ends of the recessed portions 21g of the flange portion 21d (21c) (see FIG. 4B).

A force F1 for pressing the inner column 11 is generated at the boundary points X. Here, the force F is oriented in a horizontal direction, whereas the force F1 is inclined relative to the horizontal direction by an angle $\theta$. Therefore, the inner column 11 is supported in the horizontal direction by a force of $(2 \times F1 \cos \theta)$ and supported in a vertical direction by a force of $(2 \times F1 \sin \theta)$.

Hence, in Japanese Patent Application Publication No. 2005-47487, by providing the recessed portions 21g, the inner column 11 can be supported likewise in the vertical direction by a component force of the force F1 generated at the boundary points X, and therefore the inner column 11 can be supported reliably in both the vertical and the horizontal directions.

SUMMARY OF THE INVENTION

Following problems exist in the apparatus disclosed in Japanese Patent Application Publication No. 2005-47487. As described above, the apparatus has a telescopic adjustment structure configured to fix the inner column 11 during clamping by causing the outer jacket 21 to deflect in the locations of the recessed portion 21g so as to contact the inner column 11 in the locations of the boundary points X, whereby horizontal and vertical direction component forces are generated in the locations of the boundary points X.

However, when clamping is performed to support the inner column fixedly, variation may occur in a manner in which the outer jacket 21 deflects, and at this time, variation may also occur in positions of contact points (the boundary points X) between the inner column 11 and locations above and below the recessed portions 21g of the outer jacket 21.

Hence, a clamping condition applied to the inner column 11 by the outer jacket 21 may become uneven, leading to a reduction in a holding force for holding the inner column 11, and as a result, a stable clamping condition may not be obtained. Further, depending on the manner in which the outer jacket 21 deflects in the locations of the recessed portions 21g, the outer jacket 21 and the inner column 11 may come into surface contact above and below the contact points (the boundary points X).

When contact surfaces between the outer jacket 21 and the inner column 11 remain in contact for a long time, the surfaces become fitted to each other such that the inner column 11 cannot move easily in the axial direction after the clamp is released by loosening the outer jacket 21. Moreover, frictional resistance generated by the surface contact parts increases, leading to an increase in a load exerted on a driver during telescopic adjustment.

Therefore, a technical problem to be solved (an object to be achieved) by the present invention is to provide a steering apparatus having a tilt/telescopic adjustment function, in which an inner column can be clamped and supported by an outer column securely, with stability, and without rattling, and after the clamp is released, the inner column can move smoothly relative to the outer column in an axial direction.

As a result of committed research undertaken with the aim of solving the problems described above, the inventor has solved these problems by providing, as a first aspect of the present invention, a steering apparatus including: an inner column; a left-right pair of outer column half bodies respectively having holding surface portions for holding an outer peripheral surface of the inner column; a fixing bracket having fixing side portions that sandwich the outer column half bodies; and a clamping tool that clamps the fixing bracket and the two outer column half bodies, wherein, in a condition where the inner column is clamped fixedly via the clamping tool, the inner column is held by the holding surface portions of the two outer column half bodies, an upper recessed indentation portion and a lower recessed indentation portion that do not contact the inner column are formed on the respective holding surface portions of the two outer column half bodies, strip-form contact portions that contact the inner column are formed in locations on either circumferential direction side of the upper recessed indentation portion and the lower recessed indentation portion, and the strip-form contact portions are formed in at least four locations on the two outer column half bodies.

A second aspect of the present invention solves the problems described above by providing the steering apparatus according to the first aspect, wherein respective centers of curvature of the upper recessed indentation portion and the lower recessed indentation portion differ from an axial center of the inner column. A third aspect of the present invention solves the problems described above by providing the steering apparatus according to the first or second aspect, wherein the strip-form contact portions of the outer column half bodies exhibit left-right symmetry about a diametrical center of the inner column.

A fourth aspect of the present invention solves the problems described above by providing the steering apparatus according to any one of the first to third aspects, wherein the strip-form contact portions exhibit vertical symmetry about a diametrical center of the inner column. A fifth aspect of the present invention solves the problems described above by providing the steering apparatus according to any one of the first to fourth aspects, wherein the upper recessed indentation portion and the lower recessed indentation portion are constituted by recessed arc-shaped surfaces having a smaller radius of curvature than an outer diameter of the inner column.

A sixth aspect of the present invention solves the problems described above by providing the steering apparatus according to any one of the first to fifth aspects, wherein the strip-form contact portions are formed to extend in an axial direction of each of the outer column half bodies. A seventh aspect of the present invention solves the problems described above by providing the steering apparatus according to any one of the first to sixth aspects, wherein a tip end of each of the strip-form contact portions has an arc-shaped cross-section.

According to the first aspect of the present invention, in a condition where the inner column is held by the holding surface portions of the two outer column half bodies and clamped fixedly via the clamping tool, the strip-form contact bodies that contact the inner column in at least four locations are formed on an upper side and a lower side of the respective holding surface portions of the two outer column half bodies.

When the inner column is sandwiched fixedly between the two outer column half bodies, the inner column is supported in substantially strip-form or line-form contact in a total of eight locations in the axial direction. Hence, the inner column sandwiched between the outer column half bodies is supported by means of line contact with the strip-form contact portions extending in the axial direction in eight locations, and therefore an extremely stable support structure can be provided for the inner column.

According to the second aspect of the present invention, the upper recessed indentation portion and the lower recessed indentation portion are formed such that the respective centers of curvature thereof deviate from the axial center of the inner column. Hence, in the clamped condition realized by the clamping tool, a gap between the two outer column half bodies narrows, and moreover, the upper recessed indentation portion and the lower recessed indentation portion deflect such that the strip-form contact portions contact the inner column more securely. As a result, an extremely strong contact condition can be obtained.

According to the third aspect of the present invention, the strip-form contact portions exhibit left-right symmetry about the diametrical center of the inner column, and therefore, in the support structure for the inner column, the strip-form contact portions that contact the inner column in line contact exist in two locations on both the upper side and the lower side of each of the two outer column half bodies. Further, the strip-form contact portions provided in two locations on both the upper and lower sides are arranged to be vertically symmetrical. Moreover, the respective strip-form contact portions of the two outer column half bodies are arranged to be left-right symmetrical about the diametrical center of the inner column sandwiched fixedly between the two outer column half bodies.

Hence, an imaginary shape linking the strip-form contact portions at the upper and lower ends of the two outer column half bodies and an imaginary shape linking the strip-form contact portions positioned in upper and lower substantially intermediate positions of the two outer column half bodies are both rectangular.

Further, an imaginary shape linking the two strip-form contact portions on the upper side of one outer column half body and the two strip-form contact portions on the lower side of the other outer column half body is an inclined, substantially rectangular quadrangle.

In other words, when the inner column is sandwiched between the two outer column half bodies so as to be supported fixedly thereby, the strip-form contact portions contacting the inner column in line contact form rectangles or quadrangles centering on the diametrical center of the inner column, and therefore a sandwiching structure that is highly balanced in both the up-down direction and the left-right direction can be obtained. Moreover, the inner column can be clamped (locked) with stability regardless of deformation and deflection of the outer column.

Furthermore, the upper recessed indentation portion and lower recessed indentation portion formed in the respective holding surface portions of the two outer column half bodies do not contact the inner column, and therefore the inner column is contacted only by the strip-form contact portions in the locations on either side thereof. Hence, when the clamp applied by the clamping tool is released, sliding resistance in the inner column relative to the holding surface portions of the two outer column half bodies can be reduced, thereby lessening a load on a driver. As a result, the inner column can be moved smoothly in the axial direction for the purpose of telescopic adjustment, enabling an improvement in operability.

According to the fourth aspect of the present invention, the strip-form contact portions are vertically symmetrical about the diametrical center of the inner column, and therefore substantially identical effects to the third aspect are obtained. According to the fifth aspect of the present invention, sites in which the two outer column half bodies and the outer peripheral side face of the inner column do not contact each other can be formed by means of an extremely simple configuration.

According to the sixth aspect of the present invention, the strip-form contact portions are aligned with the axial direction of the inner column, and therefore the strip-form contact portions can be brought into line contact with the inner column with an extremely high degree of precision. As a result, the inner column can be fixed with an extremely high degree of stability using the two outer column half bodies and the clamping tool. According to the seventh aspect of the present invention, the tip end of the strip-form contact portion has an arc-shaped cross-section, and therefore the tip end of the strip-form contact portion can be made more shock-resistant. Furthermore, wear caused by movement of the strip-form contact portion relative to the inner column during telescopic adjustment can be prevented.

BRIEF DESCRIPTION OF THE DRAWINGS

FIG. 2A is a sectional view taken along an arrow X1-X1 in FIG. 1A, FIG. 2B is an exploded perspective view of an outer column half body and a pivot bracket, and FIG. 2C is an enlarged view of a part (a) of FIG. 2B;

FIG. 4A is a longitudinal sectional front view of a first embodiment in which a left-right pair of outer column half bodies respectively including holding surface portions are disposed in left-right symmetry, FIG. 4B is a longitudinal sectional front view showing an action of a force applied by strip-form contact portions, which is generated by a clamping force, and FIG. 4C is an enlarged view of a part (β) of FIG. 4A;

FIG. 8A is a longitudinal sectional front view of a fifth embodiment in which the left-right pair of outer column half bodies respectively including the holding surface portions are disposed in left-right symmetry, FIG. 8B is a longitudinal sectional front view showing an action of the force applied by the strip-form contact portions, which is generated by the clamping force, and FIG. 8C is an enlarged view of a part (γ) of FIG. 8A.

DESCRIPTION OF THE PREFERRED EMBODIMENTS

Embodiments of the present invention will be described below on the basis of the drawings. Note that in the following description of the present invention, a front-rear direction is set such that when the steering apparatus according to the present invention is mounted in an automobile, a side corresponding to a front of the automobile is assumed to be a "front side" and a side corresponding to a rear of the automobile is assumed to be a "rear side", using a front-rear direction of the automobile as a reference (see FIG. 1A). Further, a direction linking the front side to the rear side will be referred to as an "axial direction", and a "width direction" indicates a left-right direction of the automobile.

Figure 3:
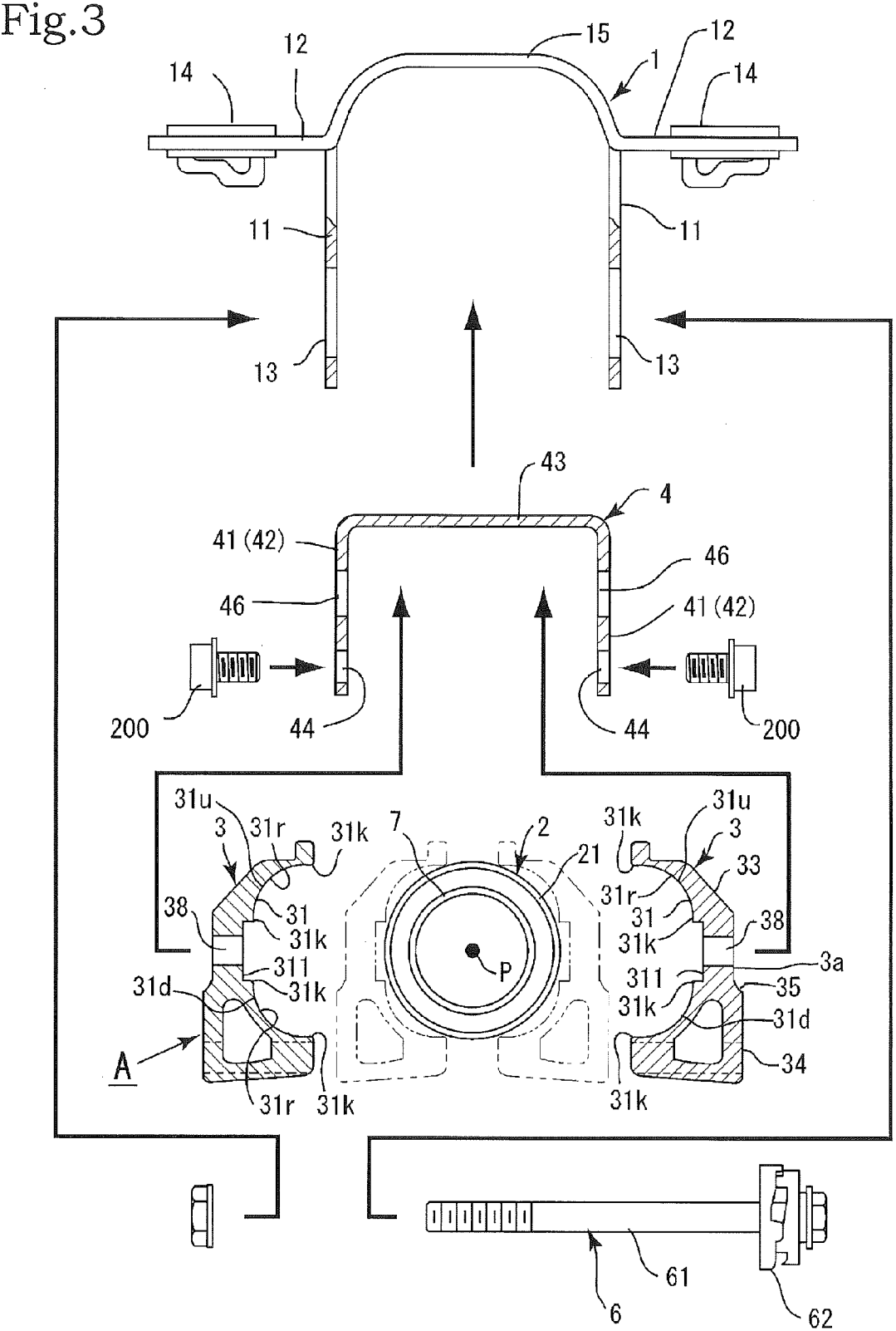
FIG. 3 is an exploded view showing a partial cross-section of a configuration of the present invention.

The present invention is principally constituted by a fixing bracket 1, an inner column 2, an outer column A constituted by a left-right pair of outer column half bodies 3, a pivot bracket 4, a clamping tool 6, and so on (see FIGS. 1 and 3).

In a condition where the inner column 2 is held by respective holding surface portions of the outer column half bodies 3 and clamped fixedly via the clamping tool 6, strip-form contact portions 31k formed in four locations on upper and lower sides of the respective holding surface portions of the two outer column half bodies 3 so as to be vertically symmetrical about a diametrical center of the inner column 2 contact the inner column 2 in line contact. The strip-form contact portions 31k of the two outer column half bodies 3 exhibit left-right symmetry about a diametrical center P of the inner column 2.

In this specification, the strip-form contact portions 31k are parts where the two outer column half bodies 3 contact the inner column 2. Further, the strip-form contact portions 31k are contact portions encompassing both "line contact portions" and "surface contact portions".

The fixing bracket 1 is constituted by fixing side portions 11 and attachment portions 12 formed on respective width direction sides, and a connecting portion 15. The attachment portions 12 are formed to extend horizontally outward from upper ends of the respective fixing side portions 11, and the attachment portions 12 are connected by the connecting portion 15 to form an integral structure.

A tilt adjustment elongated hole 13 used during tilt adjustment is formed in each fixing side portion 11 such that a lengthwise direction thereof corresponds to an up-down direction or a longitudinal direction (see FIGS. 1 and 3). Capsule members 14 are mounted respectively on the attachment portions 12, and the fixing bracket 1 is mounted in a predetermined location of a vehicle body via the two capsule members 14.

The inner column 2 is a hollow cylindrical pipe. A steering shaft 7 is mounted in an interior of the inner column 2 via a bearing or the like, and a steering wheel 73 is mounted on a rear side end portion of the steering shaft 7 (see FIG. 1A). A telescopic elongated hole 23 having a lengthwise direction that corresponds to the axial direction is formed in the inner column 2 on either width direction side.

According to the present invention, the diametrical center of the inner column 2 is set as P, an imaginary line extending in the axial direction from the diametrical center P is set as an axial center line Lp, a horizontal direction line passing through the axial center P is set as a horizontal diameter line Lh, and a vertical direction line passing through the axial center P is set as a vertical diameter line Lv (see FIG. 1).

The outer column A is constituted by the left-right pair of outer column half bodies 3 (see FIGS. 1B, 2B, and 3 to 7). The left-right pair of outer column half bodies 3 are formed in a left-right symmetrical shape (including a substantially left-right symmetrical shape), and holding surface portions 31 formed on the respective outer column half bodies 3 are disposed to face each other. The outer column half body 3 is formed from an aluminum alloy through casting, extrusion molding, or similar.

Mutually opposing sides of the two outer column half bodies 3 are set as inner sides, while outer peripheral parts other than the inner sides are set as outer sides. The holding surface portions 31 are formed on the inner sides of the respective outer column half bodies 3. The holding surface portion 31 is a semicircular (including a substantially semi-circular) indented part.

The outer side of the outer column half body 3 is constituted by an outside surface 3a, an upper surface portion 36a, and a bottom surface portion 36b. The outside surface 3a is constituted by an upper portion contact surface 33, a lower portion contact surface 34, and a step portion 35. The step portion 35 is formed on a boundary between the lower portion contact surface 34 and the upper portion contact surface 33 (see FIG. 2B).

The lower portion contact surface 34 is a substantially rectangular vertical flat surface provided below the upper portion contact surface 33 and parallel to the upper portion contact surface 33. The lower portion contact surface 34 is formed to project further outward than the upper portion contact surface 33 in a width direction of the outer column half body 3 via the step portion 35.

A screw hole 37 is formed in the upper portion contact surface 33, and the screw hole 37 is used together with a fixing bolt 200 to connect and fix the upper portion contact surface 33 to the pivot bracket 4. Further, a knock pin attachment hole 38 that penetrates the holding surface portion 31 and the upper portion contact surface 33 is formed in the outer column half body 3. A knock pin 100 is press-fitted into the knock pin attachment hole 38. A clamping bolt shaft insertion hole 39 penetrated by a bolt shaft 61 of the clamping tool 6 is formed in the lower portion contact surface 34. The clamping bolt shaft insertion hole 39 penetrates the outer side lower portion contact surface 34 and the inner side lower portion inside surface 32a (see FIG. 2B).

A recessed portion 311 is formed in a central position of the holding surface portion 31 in the up-down direction so as to extend in the axial direction. The recessed portion 311 is formed as a groove having a square cross-section, into which a slide guide 24 is inserted with play. In a condition where a held cylindrical portion 21 of the inner column 2 is held appropriately by the two outer column half bodies 3, the recessed portion 311 is formed in a position corresponding to the horizontal diameter line Lh of the inner column 2 (see FIGS. 1B, 2B, 2C, and so on). Depending on the shape of the slide guide 24, the recessed portion 311 may be arc-shaped, or when the slide guide 24 is not used, the recessed portion 311 may be omitted.

On the inner side of the outer column half body 3, a side face on a lower side of a lower end of the holding surface portion 31 will be referred to as a lower portion inside surface 32a. Further, a side face on an upper side of an upper end of the holding surface portion 31 will be referred to as an upper portion inside surface 32b. The lower portion inside surface 32a and the upper portion inside surface 32b are formed as vertical flat surfaces. Furthermore, the lower portion inside surface 32a and the upper portion inside surface 32b are flush (including substantially flush) with the vertical direction (see FIG. 2C).

The two outer column half bodies 3 are disposed in left-right symmetry such that when an outer peripheral side face of the inner column 2 is sandwiched between the two holding surface portions 31, appropriate gaps are formed respectively between the two lower portion inside surfaces 32a and between the two upper portion inside surfaces 32b.

Hanging side portions 4a are formed on either width direction side of a pivot upper portion 43 of the pivot bracket 4. The hanging side portion 4a is constituted by a pivot side portion 41 and a rear extension side portion 42, the pivot side portion 41 being formed on the vehicle body front side and the rear extension side portion 42 being formed integrally with the pivot side portion 41 on the vehicle body rear side (see FIGS. 1A and 2B).

Upper ends of the respective pivot side portions 41 are connected by the pivot upper portion 43 to form an integral structure, and the rear extension side portions 42 are formed integrally therewith so as to project toward the rear side from the pivot side portions 41 (see FIGS. 1, 2B, and so on). The rear extension side portion 42 contacts the upper portion contact surface 33 on the outside surface 3a of the outer column 3.

An elongated hole portion 46 is formed in an upper portion of the pivot side portion 41 so as to extend in the axial direction. A fixing bolt insertion hole 44 is formed in a lower portion of the pivot side portion 41, and a knock pin insertion portion 45 is formed in the rear extension side portion 42 (see FIG. 2B). The knock pin 100 is inserted into the knock pin insertion portion 45.

The pivot upper portion 43 of the pivot bracket 4 contacts upper ends of the respective outer column half bodies 3 of the outer column A. The upper end of the outer column half body 3 serves as an uppermost end position of the outer column half body 3, and corresponds to an upper end of the upper surface portion 36a.

A lower fixing bracket 5 is fixed to the vehicle body, and the pivot bracket 4 is connected to the lower fixing bracket 5 to be free to rotate. The lower fixing bracket 5 is constituted by pivotal connection side portions 52 formed on either width direction side thereof, and attachment fixing portions 51 extending outward in the width direction from upper ends of the respective pivotal connection side portions 52. A support hole portion 52a is formed in the pivotal connection side portion 52, and a fixing hole 51a is formed in the attachment fixing portion 51 to attach the lower fixing bracket 5 to a predetermined location of the vehicle body.

The two pivotal connection side portions 52 sandwich the two pivot side portions 41 of the pivot bracket 4, and the pivotal connection side portion 52 is pivotably connected to the pivot side portion 41 by a pivot shaft 53. The pivot shaft 53 is inserted into the support hole portion 52a of the pivotal connection side portion 52 and connected to the pivot side portion 41 by being inserted into the elongated hole portion 46.

Figure 1A:
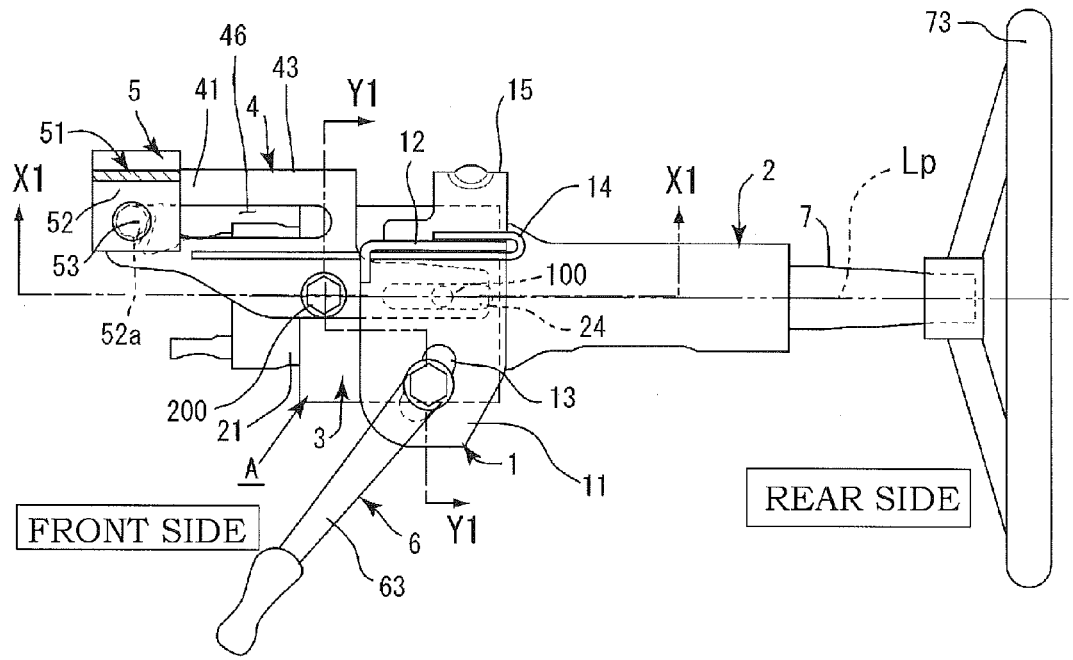
FIG. 1A is a side view showing a steering apparatus according to the present invention.
Figure 1B:
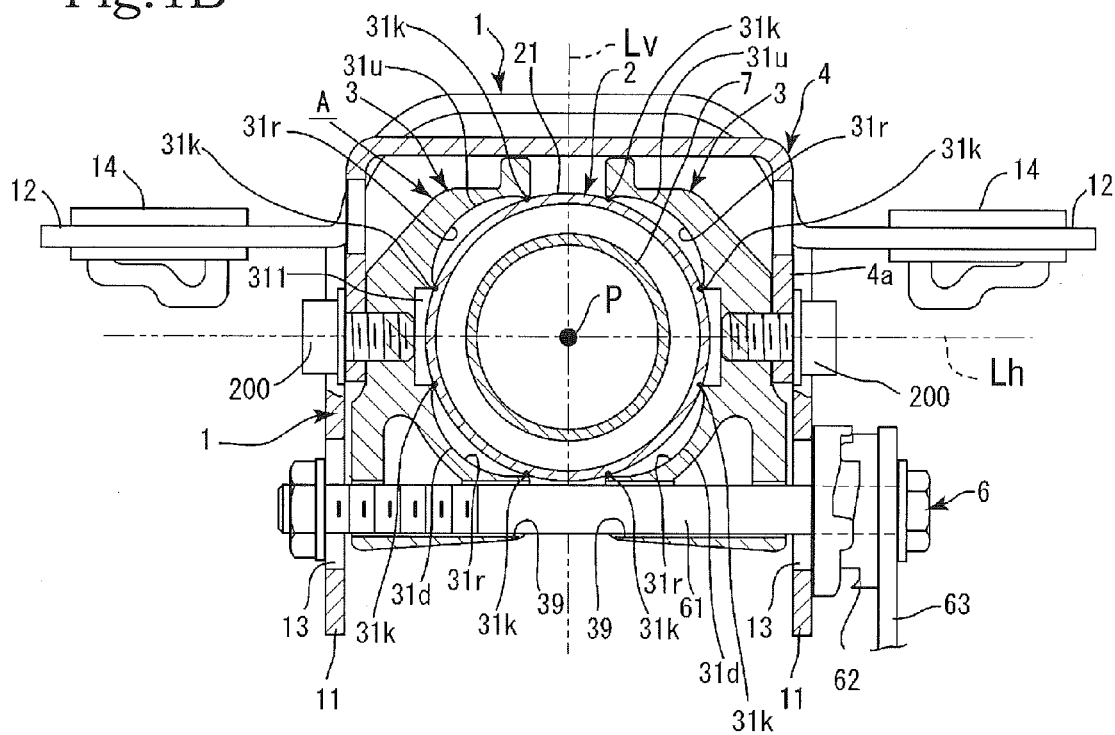
FIG. 1B is an enlarged sectional view taken along a Y1-Y1 arrow in FIG. 1A.

The clamping tool 6 is constituted by a bolt shaft 61, a clamping cam 62, and an operating lever portion 63 (see FIGS. 1A and 3). The knock pin 100 is press-fitted into the knock pin attachment hole 38, which is formed to penetrate the holding surface portions 31 and the upper portion contact surfaces 33 of the respective outer column half bodies 3. The knock pin 100 is press-fitted fixedly so as to project from both the upper portion contact surface 33 and the holding surface portion 31. On the holding surface portion 31 side in particular, a tip end of the knock pin 100 projects from the recessed portion 311 to an inner portion side of the holding surface portion 31.

When a clamping operation is performed using the operating lever portion 63 of the clamping tool 6 such that a gap between the fixing side portions 11 of the fixing bracket 1 narrows, a gap between the lower portion inside surfaces 32a of the outer column half bodies 3 of the outer column A narrows such that the inner column 2 is pivotably fixed.

The held cylindrical portion 21 of the inner column 2 is sandwiched between the holding surface portions 31 of the respective outer column half bodies 3 of the outer column A. The knock pins 100 projecting from the holding surface portions 31 of the respective outer column half bodies 3 are inserted respectively into the telescopic elongated holes 23 formed in the inner column 2 on either width direction side. By causing the knock pin 100 to contact an axial direction end portion of the telescopic elongated hole 23, a stroke range can be restricted during telescopic adjustment.

Further, the slide guide 24 is mounted in the telescopic elongated hole 23 of the inner column 2, and an inside tip end of the knock pin 100 is inserted into the telescopic elongated hole 23 via the slide guide 24 (see FIGS. 2A and 4).

The outside surfaces 3a of the two outer column half bodies 3 are sandwiched between the two hanging side portions 4a of the pivot bracket 4, and an outside tip end of the knock pin 100 projecting from the two outside surfaces 3a is inserted into the knock pin insertion portion 45. A screw shaft portion of the fixing bolt 200 is inserted into the screw holes 37 formed in the two upper portion contact surfaces 33 and the two fixing bolt insertion holes 44 formed in the two rear extension side portions 42, whereby the pivot bracket 4 is connected fixedly to the outer column half bodies 3 so as to sandwich the outer column half bodies 3.

The two fixing side portions 11 of the fixing bracket 1 sandwich the rear extension side portions 42 of the pivot bracket 4, which are fixed to the two upper portion contact surfaces 33 of the outer column A, and the lower portion contact surfaces 34, while the bolt shaft 61 of the clamping tool 6 penetrates the clamping bolt shaft insertion hole 39 in the outer column A and the tilt adjustment elongated holes 13 in the fixing bracket 1 (see FIGS. 1A and 1C). Further, the pivot side portions 41 of the pivot bracket 4 are supported by the lower fixing bracket 5.

Next, a configuration with which the inner column 2 is sandwiched between the two outer column half bodies 3 so as to be held fixedly thereby will be described. The inner column 2 is supported fixedly against the two outer column half bodies 3 by the plurality of strip-form contact portions 31k.

The strip-form contact portions 31k are constituted by respective circumferential direction ends of an upper recessed indentation portion 31u and a lower recessed indentation portion 31d formed respectively on an upper side and a lower side of the holding surface portion 31 of each outer column half body 3. The upper recessed indentation portion and the lower recessed indentation portion do not contact the inner column. The strip-form contact portions 31k of the two outer column half bodies 3 exhibit left-right symmetry about the diametrical center P of the inner column 2.

The upper side of the holding surface portion 31 is a region for holding the inner column 2 above an up-down direction center of the holding surface portion 31, while the lower side of the holding surface portion 31 is a region for holding the inner column 2 below the up-down direction center of the holding surface portion 31 (see FIGS. 2, 4A, 5A, 6, 7A, and so on).

Further, in a condition where the inner column 2 is held by the two holding surface portions 31 of the outer column half bodies 3 and clamped fixedly via the clamping tool 6, an up-down direction center position of the holding surface portion 31 is identical to an up-down direction position of the diametrical center P of the inner column 2 sandwiched between the two holding surface portions 31 (see FIGS. 1A, 4, 5, 6, and 7).

To describe a structure with which the inner column 2 is supported by the two outer column half bodies 3 in more detail, the lower recessed indentation portion 31d of the respective holding surface portions 31 of the two outer column half bodies 3 contacts an outer peripheral side face of the inner column 2 via an appropriate gap by means of the strip-form contact portions 31k formed in two locations at the two circumferential direction ends thereof. Similarly, the upper recessed indentation portion 31u contacts the outer peripheral side face of the inner column 2 via an appropriate gap by means of the strip-form contact portions 31k formed in two locations at the two circumferential direction ends thereof. The strip-form contact portion 31k extends along the axial center line Lp in the axial direction of the inner column 2 and the holding surface portion 31.

The strip-form contact portions 31k provided in the two locations of the lower recessed indentation portion 31d and the strip-form contact portions 31k provided in the two locations of the upper recessed indentation portion 31u are arranged in vertical symmetry about the diametrical center P of the inner column 2. In other words, the holding surface portion 31 of each outer column half body 3 includes the strip-form contact portions 31k in a total of four locations.

Further, the strip-form contact portions 31k of the respective holding surface portions 31 are arranged in left-right symmetry about the diametrical center P of the inner column 2. In other words, the respectively opposing strip-form contact portions 31k of the holding surface portions 31 of the two outer column half bodies 3 exist in identical positions in the up-down direction such that the outer peripheral side face of the inner column 2 is contacted and supported fixedly by the strip-form contact portions 31k in a total of eight locations. Each strip-form contact portion 31k is formed in a rib shape to extend in the axial direction of the holding surface portion 31.

Furthermore, the strip-form contact portion 31k at a circumferential direction upper end of the upper recessed indentation portion 31u is positioned substantially directly below the upper portion inside surface 32b of the outer column half body 3, while the strip-form contact portion 31k at a circumferential direction lower end of the lower recessed indentation portion 31d is positioned directly above the lower portion inside surface 32a of the outer column half body 3. The strip-form contact portion 31k in the uppermost position and the strip-form contact portion 31k in the lowermost position are positioned flush with the up-down direction (vertical direction) (see FIGS. 1A, 4A, 5A, 6, and 7A). Moreover, the strip-form contact portion 31k on the circumferential direction lower side of the upper recessed indentation portion 31u and the strip-form contact portion 31k on the circumferential direction upper side of the lower recessed indentation portion 31d are positioned close to an up-down direction intermediate position of the holding surface portion 31.

With the configuration described above, when the inner column 2 is sandwiched fixedly between the two outer column half bodies 3, the inner column 2 is supported by the strip-form contact portions 31k extending in the axial direction in a total of eight locations. Moreover, the eight strip-form contact portions 31k are arranged symmetrically in both the left-right direction and the up-down direction relative to the diametrical center P of the inner column 2 (see FIGS. 1A, 4B, 5B, and 7B).

Hence, the inner column 2 sandwiched between the two outer column half bodies 3 is supported by means of line contact with the strip-form contact portions 31k extending in the axial direction in eight locations, and therefore a support structure that is symmetrical in both the up-down direction and the left-right direction relative to the diametrical center P of the inner column 2 is obtained, with the result that the inner column can be supported with an extremely high degree of stability.

Figure 5A:
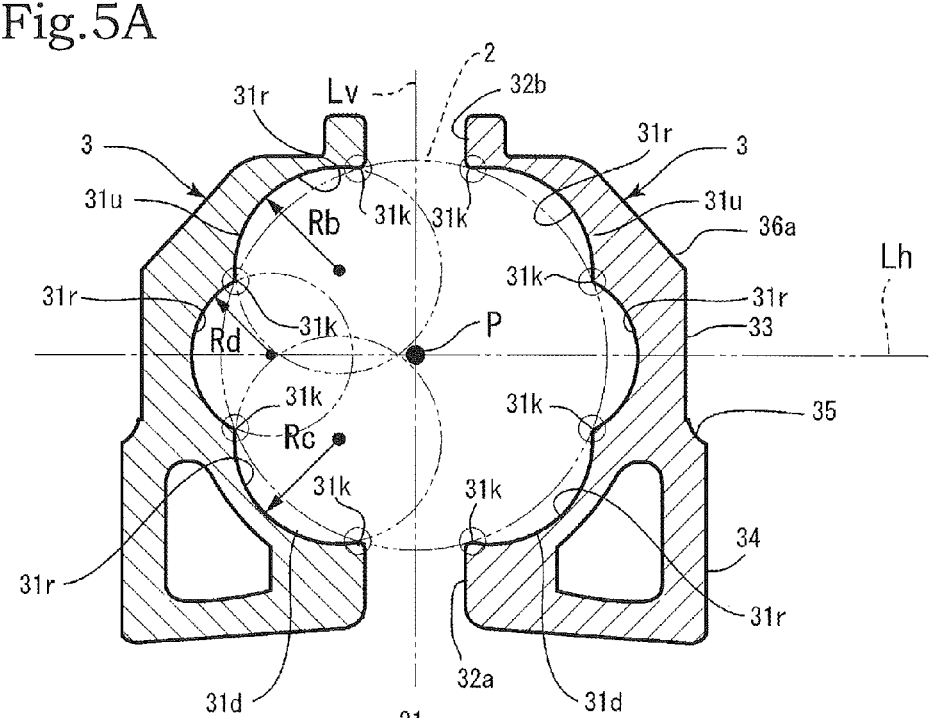
FIG. 5A is a longitudinal sectional front view of a second embodiment in which the left-right pair of outer column half bodies respectively including the holding surface portions are disposed in left-right symmetry.
Figure 5B:
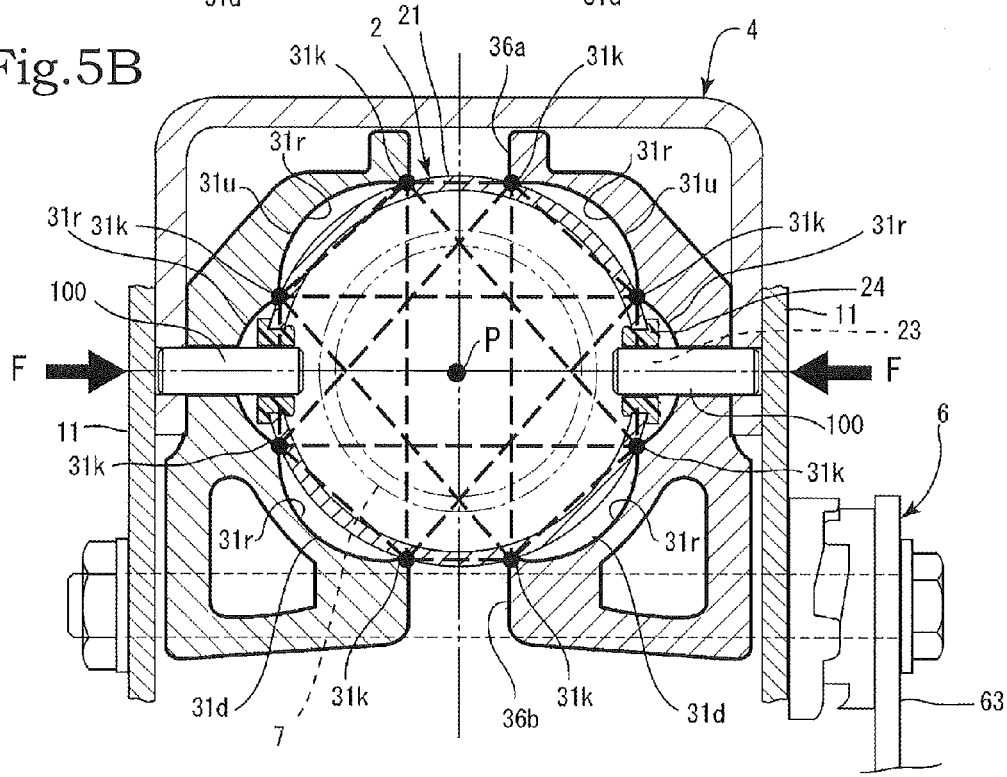
FIG. 5B is a longitudinal sectional front view showing an action of the force applied by the strip-form contact portions, which is generated by the clamping force.
Figures 7A, 7B:
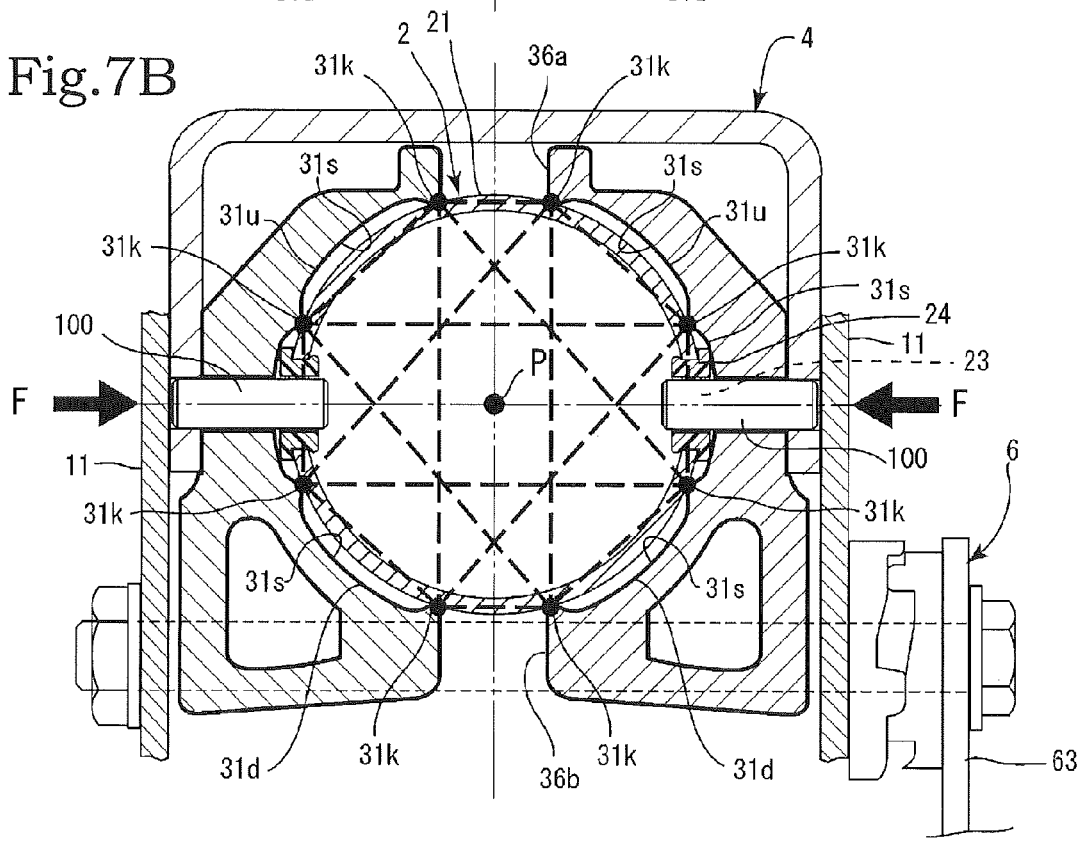
FIG. 7A is a longitudinal sectional front view of a fourth embodiment in which the left-right pair of outer column half bodies respectively including the holding surface portions are disposed in left-right symmetry.
FIG. 7B is a longitudinal sectional front view showing an action of the force applied by the strip-form contact portions, which is generated by the clamping force.

When a clamping force F of the clamping tool 6 is applied in a condition where the fixing bracket 1 and the outer column half bodies 3 are clamped in the width direction by the clamping tool 6, an imaginary shape linking the strip-form contact portions 31k at the upper and lower ends of the two outer column half bodies 3 and an imaginary shape linking the strip-form contact portions 31k positioned in upper and lower substantially intermediate positions of the two outer column half bodies 3 are both rectangular (see FIGS. 4B, 5B, and 7B).

Further, an imaginary shape linking the two strip-form contact portions 31k on the upper side of one outer column half body 3 and the two strip-form contact portions 31k on the lower side of the other outer column half body 3 is an inclined, substantially rectangular quadrangle (see FIGS. 4B, 5B, and 7B).

In other words, when the inner column 2 is sandwiched between the two outer column half bodies 3 so as to be supported fixedly thereby, the strip-form contact portions 31k contacting the inner column 2 in line contact form rectangles or quadrangles centering on the diametrical center P of the inner column 2, and therefore a sandwiching structure that is highly balanced in both the up-down direction and the left-right direction can be obtained.

Furthermore, the inner column 2 is supported by narrowing the gap between the two outer column half bodies 3, and by causing the upper recessed indentation portion 31u and the lower recessed indentation portion 31d to deflect, the contact portions can be brought reliably into contact with the inner column 2. As a result, the inner column 2 can be clamped (locked) with stability.

Further, even when variation occurs in a manner in which the two outer column half bodies 3 deform or deflect, the inner column 2 sandwiched between the two outer column half bodies 3 so as to be supported fixedly thereby is contacted only by the strip-form contact portions 31k. Therefore, when the clamp applied by the clamping tool is released, sliding resistance in the inner column 2 relative to the holding surface portions 31 of the two outer column half bodies 3 can be reduced, thereby lessening a load on a driver. Hence, the inner column 2 can be moved smoothly in the axial direction for the purpose of telescopic adjustment, enabling an improvement in operability.

The present invention includes a plurality of embodiments depending on the configuration of the holding surface portion 31 of the outer column half body 3. In a first embodiment, the upper recessed indentation portion 31u and the lower recessed indentation portion 31d of the holding surface portion 31 of the outer column half body 3 are formed as recessed arc-shaped surfaces 31r that do not contact the inner column 2. The recessed arc-shaped surface 31r is formed in the holding surface portion 31 in a substantially indented arc shape. A radius of curvature Rb of the recessed arc-shaped surface 31r of the upper recessed indentation portion 31u and a radius of curvature Rc of the recessed arc-shaped surface 31r of the lower recessed indentation portion 31d are smaller than a radius of curvature Ra of the inner column 2.

In other words,

Rb<Ra and Rc<Ra

Hence, the recessed arc-shaped surface 31r does not contact the outer peripheral side face of the inner column 2. The radius of curvature Rc of the recessed arc-shaped surface 31r of the lower recessed indentation portion 31d and the radius of curvature Rb of the recessed arc-shaped surface 31r of the upper recessed indentation portion 31u may be set at different radii of curvature.

In other words,

Rc≤Rb<Ra, or

Rb≤Rc<Ra

When the radius of curvature Rb of the recessed arc-shaped surface 31r of the upper recessed indentation portion 31u is set to be smaller than the radius of curvature Rc of the recessed arc-shaped surface 31r of the lower recessed indentation portion 31d, vertical movement of the diametrical center P of the inner column 2 can be suppressed during clamping, and as a result, a support rigidity can be improved.

When the radius of curvature Rc of the recessed arc-shaped surface 31r of the lower recessed indentation portion 31d is set to be smaller than the radius of curvature Rb of the recessed arc-shaped surface 31r of the upper recessed indentation portion 31u, the inner column 2 can be supported with an even higher degree of stability during clamping. More specifically, the recessed arc-shaped surface 31r of the lower recessed indentation portion 31d can be caused to deflect more easily, and therefore variation in positions of contact points with the inner column 2 can be suppressed, enabling stable support.

A plurality of embodiments exists with regard to the configuration of the holding surface portion 31. In the first embodiment, the upper recessed indentation portion 31u and the lower recessed indentation portion 31d are formed as the recessed arc-shaped surfaces 31r and provided singly for a total of two recessed arc-shaped surfaces 31r (see FIG. 4). In the up-down direction intermediate position of the holding surface portion 31, the recessed portion 311 having a substantially rectangular cross-section is formed instead of the recessed arc-shaped surface 31r.

In a second embodiment, in addition to the first embodiment described above, the recessed portion 311 is constituted by the recessed arc-shaped surface 31r. In other words, the recessed arc-shaped surface 31r is formed additionally on a boundary between the upper recessed indentation portion 31u and the lower recessed indentation portion 31d so that a total of three recessed arc-shaped surfaces 31r are formed (see FIG. 5). Note that Rd in FIG. 5 is the radius of curvature of the recessed arc-shaped surface 31r formed on the boundary between the upper recessed indentation portion 31u and the lower recessed indentation portion 31d.

In a third embodiment, two recessed arc-shaped surfaces 31r are formed in either the upper recessed indentation portion 31u or the lower recessed indentation portion 31d. In this case, the radii of curvature of the two recessed arc-shaped surfaces 31r formed in either the upper recessed indentation portion 31u or the lower recessed indentation portion 31d are smaller than that of a case where a single recessed arc-shaped surface 31r is formed.

Figure 6A:
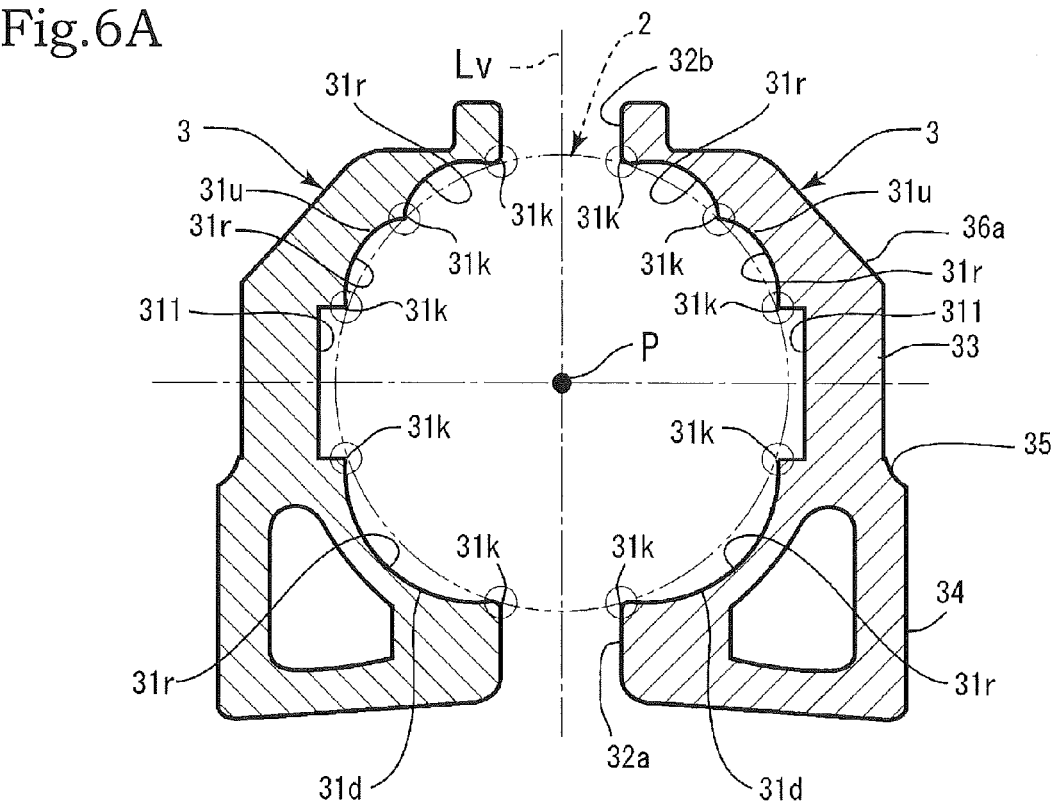
FIG. 6A is a longitudinal sectional front view of a third embodiment in which two recessed arc-shaped surfaces are formed in an upper holding region of the holding surface portions of the left-right pair of outer column half bodies disposed in left-right symmetry.
Figure 6B:
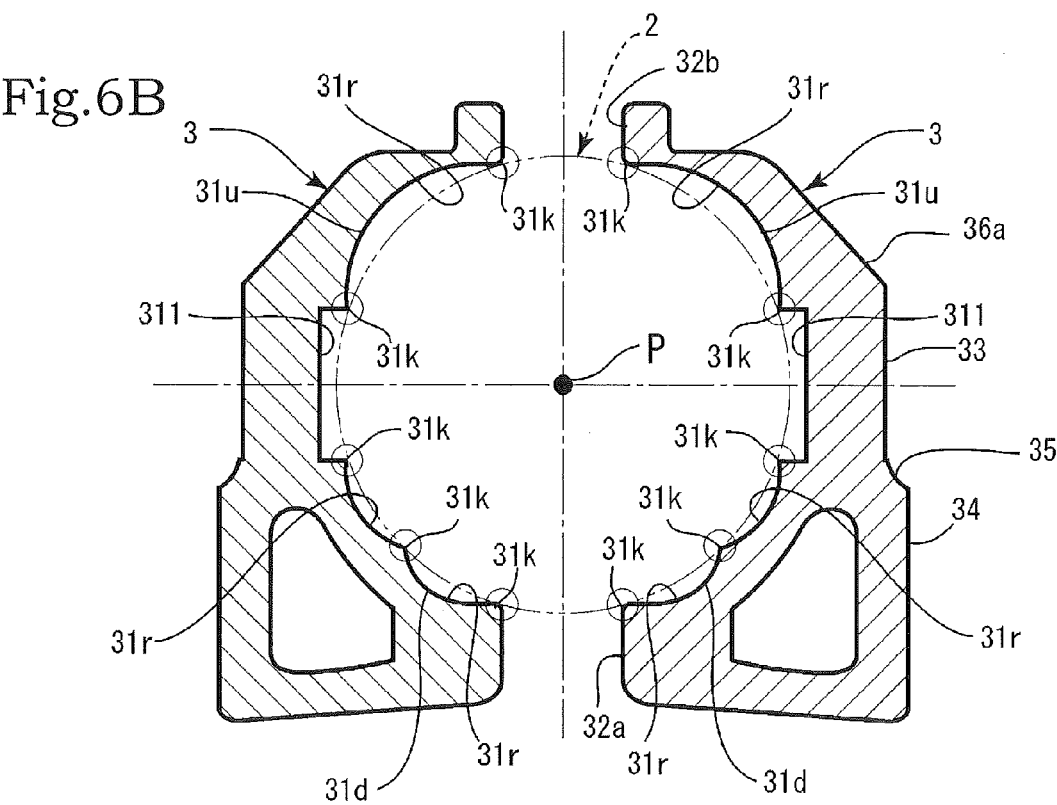
FIG. 6B is a longitudinal sectional front view of the third embodiment, in which the two recessed arc-shaped surfaces are formed in a lower holding region of the holding surface portions of the left-right pair of outer column half bodies disposed in left-right symmetry.

According to this embodiment, the number of strip-form contact portions 31k increases, and therefore the inner column 2 can be clamped by the outer column half bodies 3 even more firmly. FIG. 6A is a longitudinal sectional front view of the third embodiment, in which two recessed arc-shaped surfaces 31r are formed in the upper holding region 31u of the holding surface portions 31 of the left-right pair of outer column half bodies disposed in left-right symmetry, and FIG. 6B is a longitudinal sectional front view of the third embodiment, in which two recessed arc-shaped surfaces 31r are formed in the lower holding region 31d of the holding surface portions 31 of the left-right pair of outer column half bodies disposed in left-right symmetry.

In a fourth embodiment, recessed indentation portions 31s that do not contact the outer peripheral side face of the inner column 2 are formed instead of the recessed arc-shaped surfaces 31r according to the first to third embodiments. The recessed indentation portion 31s differs from the recessed arc-shaped surface 31r in that, as long as the recessed indentation portion 31s does not contact the outer peripheral side face of the inner column 2, a radius of curvature thereof may be equal to or greater than the radius of curvature of the inner column 2 (see FIG. 7).

Note that a center of curvature of the recessed indentation portion 31s differs from the axial center P of the inner column 2. Further, the recessed indentation portion 31s is not limited to an arc shape, and may have a flat or polygonal inner peripheral surface instead.

The strip-form contact portion 31k has a projecting shape with a substantially pointed triangular cross-section, while a tip end part thereof is formed with an arc-shaped cross-section (see FIGS. 2C and 4C). More specifically, the tip end part is formed as an extremely small arc. By forming the tip end of the strip-form contact portion 31k in the shape of a small arc in this manner, the rigidity of the contact portion can be improved, enabling increased shock-resistance. Further, the advancement of wear caused by the relative movement of the inner column during telescopic adjustment can be delayed.

In a fifth embodiment, the strip-form contact portion 31k according to the first to fourth embodiments, which has a substantially triangular cross-section so as to form a contact portion that contacts the inner column 2 substantially in line contact, is replaced with a structure that contacts the inner column 2 in surface contact (see FIG. 8). Hence, in the fifth embodiment, the strip-form contact portion 31k has a substantially square cross-section, and the tip end part thereof that contacts the inner column 2 is formed as a flat surface having a small width (see FIG. 8C).

What is claimed is:

1. A steering apparatus comprising:
   an inner column;
   a left-right pair of outer column half bodies respectively having holding surface portions for holding an outer peripheral surface of the inner column;
   a fixing bracket having fixing side portions that sandwich the outer column half bodies; and
   a clamping tool that clamps the fixing bracket and the two outer column half bodies,
   wherein, in a condition where the inner column is clamped fixedly via the clamping tool, the inner column is held by the holding surface portions of the two outer column half bodies,
   an upper recessed indentation portion and a lower recessed indentation portion that do not contact the inner column are formed on the respective holding surface portions of the two outer column half bodies,
   strip-form contact portions that contact the inner column are formed in locations on either circumferential direction side of the upper recessed indentation portion and the lower recessed indentation portion,
   the strip-form contact portions are formed in at least four locations on the two outer column half bodies,
   wherein respective centers of curvature of the upper recessed indentation portion and the lower recessed indentation portion differ from an axial center of the inner column.

2. The steering apparatus according to claim 1, wherein the strip-form contact portions are formed to extend in an axial direction of each of the outer column half bodies.

3. The steering apparatus according to claim 1, wherein a tip end of each of the strip-form contact portions has an arc-shaped cross-section.

4. The steering apparatus according to claim 1, wherein the strip-form contact portions of the outer column half bodies exhibit left-right symmetry about a diametrical center of the inner column.

5. The steering apparatus according to claim 1, wherein the strip-form contact portions exhibit vertical symmetry about a diametrical center of the inner column.

6. The steering apparatus according to claim 1, wherein the upper recessed indentation portion and the lower recessed indentation portion are constituted by recessed arc-shaped surfaces having a smaller radius of curvature than an outer diameter of the inner column.

7. A steering apparatus comprising:
   an inner column;
   a left-right pair of outer column half bodies respectively having holding surface portions for holding an outer peripheral surface of the inner column;
   a fixing bracket having fixing side portions that sandwich the outer column half bodies; and
   a clamping tool that clamps the fixing bracket and the two outer column half bodies,
   wherein, in a condition where the inner column is clamped fixedly via the clamping tool, the inner column is held by the holding surface portions of the two outer column half bodies,
   an upper recessed indentation portion and a lower recessed indentation portion that do not contact the inner column are formed on the respective holding surface portions of the two outer column half bodies,
   strip-form contact portions that contact the inner column are formed in locations on either circumferential direction side of the upper recessed indentation portion and the lower recessed indentation portion,
   the strip-form contact portions are formed in at least four locations on the two outer column half bodies,
   wherein the strip-form contact portions of the outer column half bodies exhibit left-right symmetry about a diametrical center of the inner column, and
   wherein the upper recessed indentation portion and the lower recessed indentation portion are constituted by recessed arc-shaped surfaces having a smaller radius of curvature than an outer diameter of the inner column.

8. The steering apparatus according to claim 7, wherein the strip-form contact portions exhibit vertical symmetry about a diametrical center of the inner column.

9. The steering apparatus according to claim 7, wherein the strip-form contact portions are formed to extend in an axial direction of each of the outer column half bodies.

10. The steering apparatus according to claim 7, wherein a tip end of each of the strip-form contact portions has an arc-shaped cross-section.

11. A steering apparatus comprising:
    an inner column;
    a left-right pair of outer column half bodies respectively having holding surface portions for holding an outer peripheral surface of the inner column;
    a fixing bracket having fixing side portions that sandwich the outer column half bodies; and
    a clamping tool that clamps the fixing bracket and the two outer column half bodies,
    wherein, in a condition where the inner column is clamped fixedly via the clamping tool, the inner column is held by the holding surface portions of the two outer column half bodies,
    an upper recessed indentation portion and a lower recessed indentation portion that do not contact the inner column are formed on the respective holding surface portions of the two outer column half bodies,
    strip-form contact portions that contact the inner column are formed in locations on either circumferential direction side of the upper recessed indentation portion and the lower recessed indentation portion,
    the strip-form contact portions are formed in at least four locations on the two outer column half bodies, wherein the strip-form contact portions exhibit vertical symmetry about a diametrical center of the inner column, and wherein the upper recessed indentation portion and the lower recessed indentation portion are constituted by recessed arc-shaped surfaces having a smaller radius of curvature than an outer diameter of the inner column.

12. The steering apparatus according to claim 11, wherein the strip-form contact portions are formed to extend in an axial direction of each of the outer column half bodies.

13. The steering apparatus according to claim 11, wherein a tip end of each of the strip-form contact portions has an arc-shaped cross-section.

14. A steering apparatus comprising:

an inner column;

a left-right pair of outer column half bodies respectively having holding surface portions for holding an outer peripheral surface of the inner column;

a fixing bracket having fixing side portions that sandwich the outer column half bodies; and a clamping tool that clamps the fixing bracket and the two outer column half bodies, wherein in a condition where the inner column is clamped fixedly via the clamping tool, the inner column is held by the holding surface portions of the two outer column half bodies, an upper recessed indentation portion and a lower recessed indentation portion that do not contact the inner column are formed on the respective holding surface portions of the two outer column half bodies, strip-form contact portions that contact the inner column are formed in locations on either circumferential direction side of the upper recessed indentation portion and the lower recessed indentation portion, the strip-form contact portions are formed in at least four locations on the two outer column half bodies, and wherein the upper recessed indentation portion and the lower recessed indentation portion are constituted by recessed arc-shaped surfaces having a smaller radius of curvature than an outer diameter of the inner column.

15. The steering apparatus according to claim 14, wherein the strip-form contact portions are formed to extend in an axial direction of each of the outer column half bodies.

* * * * *